(12) United States Patent
Vemuri et al.

(10) Patent No.: US 12,081,134 B2
(45) Date of Patent: Sep. 3, 2024

(54) FLYBACK CONVERTER WITH SECONDARY SIDE REGULATION

(71) Applicant: Texas Instruments Incorporated, Dallas, TX (US)

(72) Inventors: Satish Kumar Vemuri, Raleigh, NC (US); James M. Walden, Apex, NC (US); Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/211,318

(22) Filed: Jun. 19, 2023

(65) Prior Publication Data
US 2023/0336089 A1 Oct. 19, 2023

Related U.S. Application Data

(60) Division of application No. 15/987,493, filed on May 23, 2018, now Pat. No. 11,722,067, which is a
(Continued)

(51) Int. Cl.
*H02M 3/335* (2006.01)
*H02M 1/00* (2006.01)

(52) U.S. Cl.
CPC ... *H02M 3/33592* (2013.01); *H02M 3/33523* (2013.01); *H02M 1/0009* (2021.05); *Y02B 70/10* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 5,412,555 A 5/1995 Uramoto
5,457,624 A 10/1995 Hastings
(Continued)

FOREIGN PATENT DOCUMENTS

CN 1529403 A 9/2004
CN 101350559 A 1/2009
(Continued)

OTHER PUBLICATIONS

Zhang, et al., "A High Efficiency Flyback Converter With New Active Clamp Technique", IEEE Transactions on Power Electronics, vol. 25, No. 7, Jul. 2010, pp. 1775-1785.
(Continued)

*Primary Examiner* — Jeffrey A Gblende
(74) *Attorney, Agent, or Firm* — Ray A. King; Frank D. Cimino (57) ABSTRACT

Disclosed examples include flyback converters, control circuits and methods to facilitate secondary side regulation of the output voltage. A primary side control circuit operates a primary side switch to independently initiate power transfer cycles to deliver power to a transformer secondary winding in a first mode. A secondary side control circuit operates a synchronous rectifier or secondary side switch to generate a predetermined cycle start request signal via a transformer auxiliary winding to assume secondary side regulation and to cause the primary side controller to initiate new power transfer cycles.

9 Claims, 8 Drawing Sheets

Related U.S. Application Data continuation of application No. 15/202,629, filed on Jul. 6, 2016, now Pat. No. 10,008,947.

(60) Provisional application No. 62/199,791, filed on Jul. 31, 2015.

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; Y02B 70/1491
See application file for complete search history.

(56) References Cited

U.S. PATENT DOCUMENTS

| | | | |
|---|---|---|---|
| 5,745,358 | A | 5/1998 | Faulk |
| 6,441,598 | B1 | 8/2002 | Ivanov |
| 6,504,267 | B1 | 1/2003 | Giannopoulos |
| 6,686,729 | B1 | 2/2004 | Kawamura et al. |
| 6,861,826 | B2 | 3/2005 | Lynch |
| 8,963,529 | B2 | 2/2015 | Cohen |
| 8,964,420 | B2 | 2/2015 | Zhang |
| 9,621,053 | B1 | 4/2017 | Telefus |
| 9,853,563 | B2 | 12/2017 | Zong |
| 10,033,283 | B2 * | 7/2018 | Gong ................ H02M 3/33523 |
| 2002/0141209 | A1 | 10/2002 | Bridge |
| 2004/0070378 | A1 | 4/2004 | Baldwin et al. |
| 2007/0121258 | A1 | 5/2007 | Hachiya |
| 2008/0278975 | A1 | 11/2008 | Degen |
| 2008/0298106 | A1 | 12/2008 | Tateishi |
| 2010/0027298 | A1 | 2/2010 | Cohen |
| 2010/0195254 | A1 | 8/2010 | Cohen et al. |
| 2010/0201335 | A1 | 8/2010 | Li |
| 2010/0315840 | A1 | 12/2010 | Cohen |
| 2011/0090725 | A1 | 4/2011 | Lu |
| 2011/0205764 | A1 | 8/2011 | Sheng et al. |
| 2012/0127762 | A1 | 5/2012 | Reddv |
| 2012/0275198 | A1 | 11/2012 | Cohen |
| 2013/0051088 | A1 | 2/2013 | Yamashita |
| 2013/0077356 | A1 | 3/2013 | Cohen |
| 2013/0235620 | A1 | 9/2013 | Morris |
| 2014/0085952 | A1 | 3/2014 | Ptacek |
| 2014/0192564 | A1 * | 7/2014 | Tang ................ H02M 3/33592 363/21.14 |
| 2015/0092454 | A1 | 4/2015 | Cohen |
| 2015/0103563 | A1 | 4/2015 | Wang |
| 2015/0103567 | A1 | 4/2015 | Wang |
| 2015/0214846 | A1 | 7/2015 | Cohen |
| 2015/0372605 | A1 | 12/2015 | Karlsson |
| 2016/0056704 | A1 | 2/2016 | Deboy |
| 2016/0359421 | A1 | 12/2016 | Lin |

FOREIGN PATENT DOCUMENTS

| | | |
|---|---|---|
| CN | 102377357 A | 3/2012 |
| CN | 103280995 A | 9/2013 |

OTHER PUBLICATIONS

Search Report for Chinese Patent Application No. 201610619877.8, Sep. 16, 2019, 2 pages.
CN101350559A, Machine Translation, 33 pages.
CN103280995A, Machine Translation, 22 pages.
CN1529403A, Machine Translation, 13 pages.
CN102377357A, Machine Translation, 19 pages.

\* cited by examiner

FLYBACK CONVERTER WITH SECONDARY SIDE REGULATION

REFERENCE TO RELATED APPLICATION

This application is a division of U.S. patent application Ser. No. 15/987,493 filed on May 23, 2018, which is a continuation of U.S. patent application Ser. No. 15/202,629, filed on Jul. 6, 2016, now U.S. Pat. No. 10,008,947, which claims priority to, and the benefit of, U.S. provisional patent application No. 62/199,791, entitled "SOFT SWITCHING FLYBACK CONVERTER WITH PRIMARY CONTROL", filed on Jul. 31, 2015. The entirety of the above referenced applications are hereby incorporated by reference.

TECHNICAL FIELD

The present disclosure relates generally to flyback converters, and more particularly to secondary side regulation (SSR) of flyback converters.

BACKGROUND

Flyback converters are used to perform DC-DC conversion in order to drive an output load with a transformer isolating the input and output. An input rectifier circuit can be used for AC-DC applications. A primary side switch is turned on to magnetize the transformer primary winding, and power is transferred to the secondary circuit when the primary side switch is turned off. A diode can be connected with the secondary winding to allow current to flow to the load. A secondary side switch can be used as a synchronous rectifier to provide efficiency advantages over passive rectified flyback converters. For discontinuous mode (DCM) flyback converters, the output voltage is controlled by the timing of the power transfer cycle start by turning the primary switch on. The isolation barrier between the controlled switch on the primary side and the regulated output voltage on the secondary side presents difficulties for output regulation. Primary side regulated (PSR) flyback converters require transfer of feedback information across the isolation barrier. In one PSR approach, the secondary output voltage is indirectly sensed on the primary side through an auxiliary winding in the power transformer. PSR is used in very low cost, low power applications. Secondary side regulated (SSR) can directly sense the output voltage, but need to convey control signaling through the isolation barrier to the primary side. Conventional SSR designs use dedicated optical, magnetic or capacitive isolators to provide analog or digital feedback to close the loop or to control the primary power switch. SSR flyback converters provide many advantages over PSR designs, including tighter output voltage regulation, better transient response, enabling communication with the load without the need for signal isolators etc. However, SSR controllers or secondary side controllers (SSC) need to communicate across the isolation barrier with the primary side controller (PSC) or gate driver, and typical SSR configurations require extra components to control the primary side switch through analog or digital communication across the isolation barrier.

SUMMARY

Disclosed examples include flyback converters, control circuits and methods to facilitate secondary side control of a flyback converter without significantly increasing circuit board space or component count. A primary side control circuit operates a primary side switch to independently initiate power transfer cycles to deliver power to a transformer secondary winding in a first mode. A secondary side control circuit operates a synchronous rectifier or secondary side switch to generate a predetermined cycle start request signal via a transformer auxiliary winding to assume secondary side regulation and to cause the primary side controller to initiate new power transfer cycles to regulate the output voltage. In certain examples, the secondary control circuit generates cycle start request signals at or near a valley in a ringing secondary switch voltage waveform to mitigate switching losses.

DETAILED DESCRIPTION

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

Figure 1:
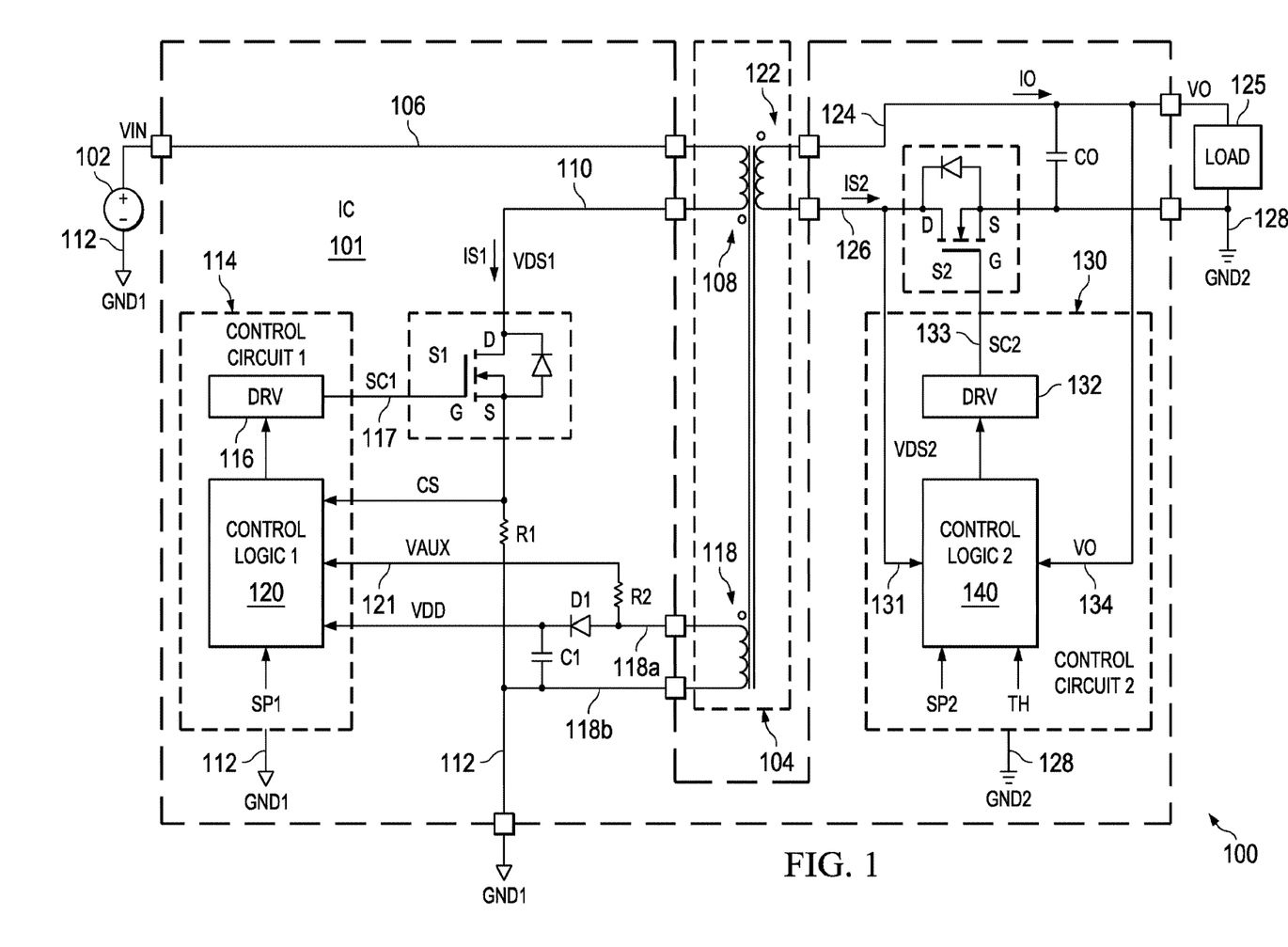
FIG. 1 is a schematic diagram of a synchronously rectified DCM flyback converter with a single integrated circuit providing primary and secondary side control circuitry, in which a secondary side controller turns on a secondary switch to signal a primary side controller via an auxiliary transformer winding to initiate power transfer cycles for SSR control.
Figure 2:
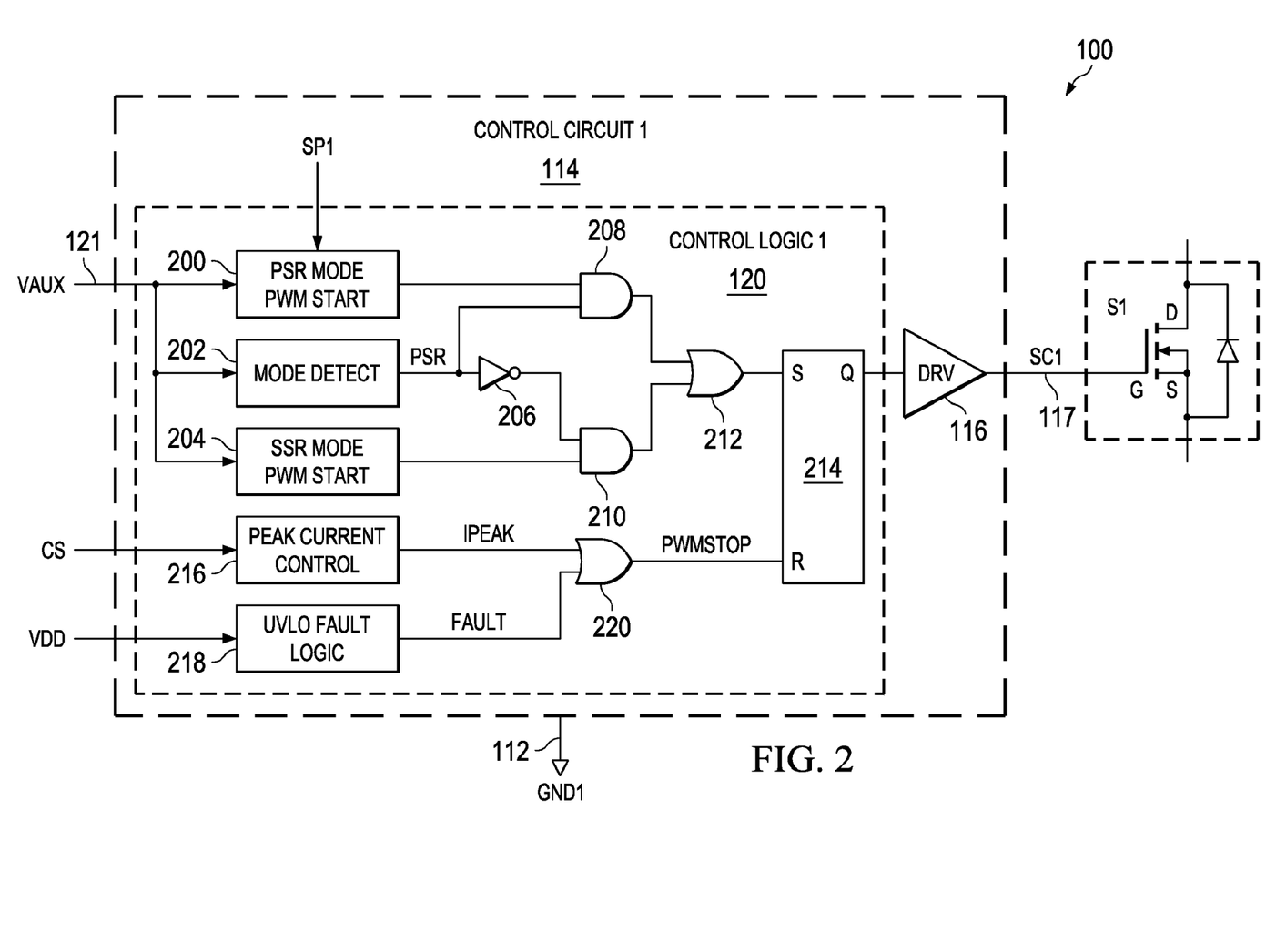
FIG. 2 is a schematic diagram showing further details of the primary side controller of FIG. 1.
Figure 3:
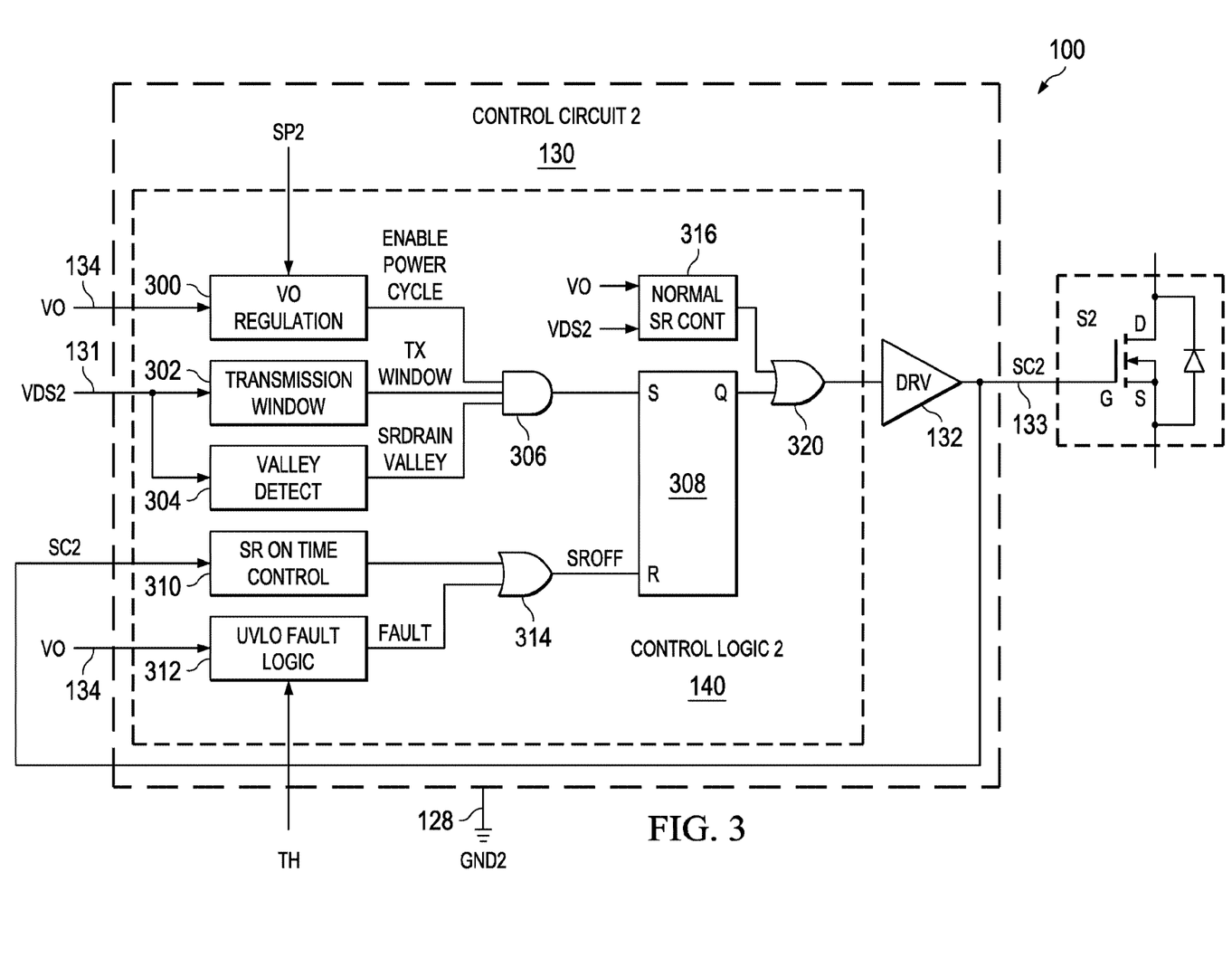
FIG. 3 is a schematic diagram showing further details of the secondary side controller of FIG. 1.

Referring initially to FIGS. 1-3, FIG. 1 shows a flyback power converter or conversion system 100 including a controller integrated circuit (IC) 101 having a first control circuit (e.g., a primary side controller or PSC) 114 and a second control circuit (e.g., a secondary side controller or SSC) 130, as well as a transformer 104 with a primary winding 108 and a secondary winding 122. The transformer 104 also includes an additional or auxiliary winding 118 on the primary side. The converter 100 receives a DC input voltage signal VIN from a DC source 102 relative to a first constant voltage or reference voltage node 112, in this case a first ground connection GND1. The system 100 can implement AC-DC conversion where the DC source 102 in one example represents an AC input with a full or half bridge rectifier circuit (not shown). The flyback converter system 100 provides an output voltage VO to drive a load 125 with respect to a second constant voltage node 128, in this example a second ground connection GND2.

The first (primary side) control circuit 114 includes a driver circuit 116 with an output 117 to provide a first switching control signal SC1 under control of a first control logic circuit 120. The logic circuit 120 is coupled with the driver circuit 116, and includes an input 121 coupled with the auxiliary winding 118 through a resistor R2 to receive a signal VAUX representing a voltage of the auxiliary winding 118. The control circuit 114 initially operates in a first mode for independent initiation of power transfer cycles. The first control circuit 114 receives a predetermined cycle start request signal from the second control circuit 130 via the auxiliary winding 118 to initiate power transfer cycles for operation in a second mode to implement secondary side regulation (SSR) of the output voltage VO. In one example, the predetermined cycle start request signal is a predetermined sequence. The converter 100 can implement discontinuous current mode (DCM) flyback conversion including the above-mentioned advantages of secondary side regulation without significant increase in occupied circuit board space of a host system, and without introduction of additional external components. In the second operating mode, the second control circuit 130 controls the timing and frequency of power transfer cycles, and implements closed loop regulation of the output voltage VO and/or the output current IO delivered to the load 125. In one example, the first control circuit 114 operates in the second mode to initiate power delivery cycles in response to receipt of the predetermined cycle start request signal from the second control circuit 130. The first control circuit 114 in one example controls the on time of the primary side switching to implement a peak current mode control.

The flyback converter 100 includes a primary side or first switch S1, and a secondary side or second switch S2. The first switch S1 is operated by the first switching control signal SC1 from the first control circuit 114, and the second switch S2 is operated according to the second switching control signal SC2 from the second control circuit 130. In one example, the switches S1 and S2 and the control circuits 114 and 130 are provided in a single flyback controller integrated circuit 101 as shown in FIG. 1, including terminals or pins or other suitable connections for receiving the input voltage VIN, one or more ground connections, connections to the external transformer 104, and one or more output connections to provide the output voltage VO to the load 125. In other examples, the transformer 104 can be included within the controller IC 101. In other possible implementations, separate first and second controller ICs 101a and 101b can be used for the primary and secondary side switching control, as shown below in FIG. 8. The switches S1 and S2 can be integral to the IC 101 as shown in FIG. 1, or can be external components in other examples with the IC 101 including suitable pins for connection to control external first and second switches S1 and S2. The illustrated examples include N-channel field effect transistor (FET) switches S1 and S2. Other types of switches can be used, including without limitation P-channel FETs, bipolar transistors (P or N-type), insulated gate bipolar transistors (IGBTs), or the like, or combinations thereof, with the respective control circuits 114 and 130 providing suitable switching control signals SC1 and SC2 in order to actuate the switches S1 and S2.

The transformer 104 includes the primary and secondary windings 108 and 122, which are magnetically coupled with one another, for example, by being wound at least partially around a common core structure (not shown). In addition, the transformer 100 for includes the auxiliary winding 118 which is also magnetically coupled to the primary and secondary windings 108 and 122, for instance, by also being wound on the common core. The primary winding 108 includes a first end 106 to receive the input voltage signal VIN, and a second end 110 connected to the first terminal or drain (D) of the first switch S1.

The first switch S1 includes a second or source terminal (S) coupled to GND1 through a current sense resistor R1 that provides a current sense signal CS to the first control circuit 114. The first switch S1 operates according to the signal SC1 provided to its control terminal (e.g., gate G) by the first control circuit 114. The first switch S1 also includes a body diode having an anode connected to the source terminal, and a cathode connected to the drain terminal. In operation, the first switch S1 is placed in an on state or condition to selectively allow a first switch current IS1 to flow between the first and second terminals (D, S) of the switch S1 when the first switching control signal SC1 is in a first state (e.g., HIGH for an N-channel FET S1). In this condition, current flows from the input source 102 into the first end 106, including the current IS1 flowing through the first switch S1, and current associated with a magnetizing inductance of the primary winding 108. When the first switching control signal SC1 is in a different second state (e.g., LOW), the first switch S1 is in an off state or condition that prevents current flow between the first and second switch terminals D and S.

The transformer secondary winding 122 includes a first end 124 coupled to provide the output voltage signal VO to drive the load 125, and a second end 126 coupled with the second switch S2. The second switch S2 includes a first terminal (e.g., drain D) coupled with the second end 126 of the secondary winding 122, and a second terminal (e.g., source S) coupled GND2. The switch S2 also includes a second control terminal (e.g., gate G) coupled to receive the second switching control signal SC2 from the second control circuit 130, as well as a body diode as shown in FIG. 1. The second switch S2 operates in an on state or condition to allow a second switch current IS2 to flow between its source and drain terminals D and S (e.g., between the second end 126 of the secondary winding 122 and GND2) when the second switching control signal SC2 is in a first state (e.g., HIGH for an N-channel FET S2). In this configuration, the output current IO flows between the first end 124 of the secondary winding 122 and the output load 125. S2 operates in an off state or condition to prevent current flow between its source and drain terminals D and S when the signal SC2 is in a different second state (e.g., LOW). Although the illustrated example includes the secondary side switch S2 in the lower circuit branch between the lower end 126 of the secondary winding 122 and the second constant voltage node GND2, other examples are possible in which the secondary side switch S2 is connected between the upper end 124 and the load 125, with the lower secondary winding end 126 coupled with GND2.

The second switch S2 in the example of FIG. 1 provides a synchronous rectifier to mitigate voltage drop inefficiencies that would result from use of a simple diode connected between GND2 and the and 126 of the secondary winding 122. In this case, the second control circuit 130 operates as a synchronous rectifier controller to turn on the switch S2 during portions of power transfer cycles in which power is transferred to the load 125. In other possible examples, a separate diode (not shown) is used for power delivery during the power transfer cycles, including an anode connected to GND2 and a cathode connected to the secondary winding and 126. In such implementations, a second switch S2 can be connected as shown in FIG. 1, but need not be turned on by the control circuit 130 during power delivery portions of the power transfer cycles. In this case, the separate diode can be used to allow conduction of the output current IO after the primary side switch S1 is turned off in a given power delivery cycle, and the secondary side switch S2 is actuated by the control circuit 130 in order to provide a predetermined cycle start request signal to facilitate secondary side regulation of the output voltage VO. It will be appreciated that such a second switch S2 need not be as large as a synchronous rectifier, as the separate diode would be used to transfer the current IO delivered to the load 125, and the signaling second switch S2 would not require the same current carrying capability.

The auxiliary winding 118 of the transformer 100 for in this example includes a first end 118a coupled through a resistor R2 to provide the first signal VAUX representing the auxiliary winding voltage to the first control circuit 114. The VAUX signal can be monitored directly, through a voltage divider, or by converting it to a proportional current by an external resistor connected between the auxiliary winding and GND1. The first end 118a of the auxiliary winding 118 is also used in this example to provide power to the first control circuit 114 via a rectifier diode D1 and a capacitor C1 to deliver a DC voltage signal VDD to the first control circuit 114. The auxiliary winding 118 further includes a second end 118b coupled with GND1.

In operation of the flyback converter 100, the second switch S2 is turned off and the first switch S1 is turned on to initiate a power transfer cycle, which magnetizes the primary winding 108. When S1 is turned off by the first controller 114, the second controller 130 turns on the second switch S2 and the secondary winding 122 establishes a voltage between the first and second ends 124 and 126, causing current IO to flow to an output capacitor CO and the load 125. In one example, the second control circuit 130 turns the second switch S2 off when the secondary current IS2 reaches zero. When the first and second switches S1 and S2 are thus turned off, a resonant isolation or ringing occurs in the second switch voltage of S2 (e.g., drain-source voltage VDS2 relative to GND2) due to the charge transfer between the switch capacitance (not shown) of the second switch S2, the inductance of the secondary winding 122, and the capacitance of CO. This resonant ringing condition results in peaks and troughs (valleys) in the switch voltage signal VDS2, where the troughs generally reach zero volts in the first few ring cycles. In this state, moreover, resonant ringing also occurs in this switching condition in the first drain-source switch voltage signal VDS1 across the first switch S1. The ringing waveform on the primary side switch voltage signal VDS1 is also seen in the first signal VAUX representing the auxiliary winding voltage. On the primary side, the ringing waveform in the VDS1 and VAUX signals includes resonant peaks that generally reach the input voltage level VIN, and valleys or troughs that generally do not reach zero (GND1). It is noted that initiating a subsequent power transfer cycle by turning the first switch S1 on at the troughs of the first switch voltage VDS1 can reduce hard switching losses in S1.

The first control circuit 114 receives the first signal VAUX via the input 121. The VAUX signal represents the voltage of the auxiliary winding 118, and control circuit 114 can assess the signal waveform associated with the auxiliary winding 118 in order to detect the presence or absence of a predetermined cycle start request signal from the second control circuit 130. The first control circuit 114 operates in one of two modes, including a first mode for primary side regulation (PSR) following initial power up of the flyback converter 100, as well as a second mode for secondary side regulation (SSR). In the first mode, the first control circuit 114 initiates one or more power transfer cycles by turning the first switch S1 on and off. In one example, the first mode operation of the control circuit 114 includes implementing peak current control to determine the total on time of the first switch S1 during each cycle according to the current sense input signal CS. In certain examples, moreover, the first control circuit 114 implements open loop control in the first mode with respect to the output voltage VO. For example, the first control circuit 114 can operate according to a predetermined time period between successive power transfer cycles. This operation, in conjunction with operation of the second control circuit 130 in the case of synchronous rectifier implementations (or through operation of a separate secondary side rectifier diode), causes the output voltage VO to build up over time following power up through the open loop power transfer operation of the first control circuit 114. In other examples, the logic circuit 120 of the first control circuit 114 can implement some form of closed loop control in the first mode (primary side regulation) according to a first setpoint signal or value SP1. In this case, the control circuit 114 can indirectly sense or infer the output voltage VO based on the auxiliary winding voltage signal VAUX in the first mode.

FIG. 2 shows an example of the primary side control circuit 114, including the first control logic circuit 120. The first logic circuit 120 can include any suitable analog and/or digital circuitry, programmable or preconfigured, to implement the functions set forth herein. In this example, the logic circuit 120 includes a PSR mode start logic circuit 200 that receives the VAUX signal from the input 121, and provides a Boolean output to selectively start or initiate new power transfer cycles based on indirectly sensed output voltage information derived from the VAUX signal and the first setpoint SP1. The logic circuit 120 further includes a mode detect circuit 202 providing a Boolean output signal PSR indicating receipt of an initial cycle start request signal in the VAUX signal, as well as a SSR mode start logic circuit 204 that provides a Boolean output to selectively start or initiate new power transfer cycles in response to receipt of a predetermined cycle start request signal of the VAUX signal. The outputs of the circuits 200, 202 and 204 are provided as inputs to gate logic circuits including an inverter to 06, AND gates 208 and 210, and an OR gate 212 that provides a set or "S" input signal to a flip-flop 214. The first control logic circuit 120 further includes a peak current control logic circuit 216, and under voltage lock out (UVLO) fault logic circuit 218 and a second OR gate 220 that provides an output signal PWMSTOP to a reset or "R" input of the flip-flop 214.

The flip-flop" Q" output provides an input to the driver 116 to generate the first switch control signal SC1 to operate the first switch S1.

The under voltage fault logic circuit 218 receives the supply voltage signal VDD generated by the auxiliary winding 118 and the rectifier circuitry D1, C1 in FIG. 1, and generates a FAULT output signal as an input to the OR gate 220 when the supply voltage VDD is less than a threshold level. The circuit 218 prevents operation of the first switch S1 when the supply voltage VDD falls below a certain level and the circuit 218 can include a comparator or other circuitry suitable to generate the FAULT signal. When the circuit 120 receives sufficient supply voltage VDD (FAULT is logic high), the peak current control block 216 asserts an output signal IPEAK as a logic high input to the OR gate 220 when the current sense signal CS reaches a predetermined level. In one example, the peak current control circuit 216 includes a comparator with an output providing the IPEAK signal and inputs for the current sense signal CS and a reference voltage signal (not shown) representing the predetermined level of the first switch current signal IS1 at which the first switch S1 is to be turned off in each power transfer cycle. This operation of the circuits 216 and 218 provides the PWMSTOP output signal from the OR gate 220 at a high logic level in order to reset the flip-flop 214 and turn off the first switch S1. In this example, the first control circuit 114 implements peak current control in order to regulate the on time of the first switch S1 for initiating individual power transfer cycles.

The circuits 200, 202 and 204, as well as logic gates 206-212 provide the set input to the flip-flop 214 as a logic high signal when the first switch S1 is to be turned on in a given power transfer cycle. The mode detect block 202 provides the PSR output at a high logic level when the first control circuit 114 is to operate in the first mode (PSR). For example, when the circuit 114 is initially powered up, the mode detect circuit 202 provides a high logic PSR output signal to start the circuit 114 in the first mode. During operation in the first mode, the PSR mode PWM start block 200 operates either to initiate power transfer cycles by asserting its output at a high logic level periodically (open loop control), or according to a comparison of the inferred output voltage via the VAUX signal with the first setpoint signal SP1. In this manner, the output of the AND gate 208 provides a logic high Boolean output signal as an input to the OR gate 212 in the first mode to initiate the start of a power transfer cycle by causing S1 to be turned on. In one example, the circuit 200 asserts its output at a logic high level when the VAUX input reaches zero indicating that the current in the secondary winding 122 has reached zero. In this manner, the primary side control circuit 114 can implement open loop control to begin a new power transfer cycle after the previous cycle is completed in the first mode.

The mode detect block 202 also monitors the VAUX signal from the input 121 in order to detect receipt of a predetermined cycle start request signal from the secondary side control circuit 130. Once the signal has been detected by the mode detect block 202, the PSR output goes to a logic low level, which disables the AND gate 208, and enables the second AND gate 210 through the inverter 206. In one example, the mode detect circuit 202 maintains the PSR signal in the logic low state thereafter once the initial cycle start request signal has been detected. This change in the PSR mode signal changes operation of the first control circuit 114 from the first mode (primary side regulation) to the second mode (secondary side regulation). In the second mode, the SS are mode PWM start circuit 204 monitors the VAUX signal from the input 121 for the predetermined cycle start request signals, and asserts its output at a logic high level in response to the start signal receipt. When the output of the circuit 204 goes to the logic high level, the AND gate provides a high signal to the second input of the OR gate 212, which then asserts the "S" input of the flip-flop 214 in order to turn on the switch S1 and begin a new power transfer cycle. As explained further below, the secondary side control circuit 130 may selectively generate one or more different types of predetermined cycle start request signals. In one example, the mode detect circuit 202 and the SSR mode PWM start circuit 204 can detect and react to either of two different predetermined cycle start request signals identified in the VAUX input. In this manner, the control circuit 114 detects the predetermined cycle start request signal as an interruption of a ringing waveform of the first signal VAUX at the first input 121 and/or a spike in the first signal VAUX at the first input 121. As used herein, an interruption of the ringing waveform includes distortion, flatness, discontinuities or other interruption in the ringing waveform.

FIG. 3 shows an example of the secondary side control circuit 130, including an example of the second control logic circuit 140. The logic circuit 140 can include any suitable analog and/or digital circuitry, programmable or preconfigured, to implement the functions set forth herein. The second control circuit 130 includes a driver circuit 132 with an output 133 to provide the second switching control signal SC2 to the second switch S2. The second control circuit 130 also includes a second control logic circuit 140 coupled with the driver circuit 132. The logic circuit 140 selectively causes the driver circuit 132 turn the second switch S2 on and off. In one example, the second logic circuit 140 causes the driver 132 to actuate the second switch S2 for synchronous rectification operation as part of the power transfer cycles, and additionally turns S2 on and off a second time in each power transfer cycle in the second mode to generate the predetermined cycle start request signals to regulate the output voltage signal VO. Where a separate secondary side rectifier diode (not shown) is used during the power transfer cycles, the second logic circuit 140 causes the driver 132 to turn the second switch S2 on and off after the secondary current IS2 returns to zero in a given power transfer cycle to generate a predetermined cycle start request signal in order to cause the first control circuit 114 to initiate a new power transfer cycle (i.e., the second switch S2 does not need to be turned on during power transfer if a separate rectifier diode is used).

The second logic circuit 140 includes a first input 131 coupleable to the second winding 122 to receive the second switch voltage signal VDS2 representing the voltage of the switch S2, and also includes a second input 134 coupled to the first end 124 of the secondary winding 122 in order to receive the output voltage signal VO for closed loop regulation operation. In the second operating mode, the second control circuit 130 generates cycle start request signals by operating the switch S2 in order to control the timing of new cycle initiation by the first control circuit 114. In this manner, the second control circuit 130 regulates the output voltage signal level VO according to a second setpoint signal or value SP2. In one example, SP1 is lower than SP2. The second setpoint SP2 can be the same as the first setpoint SP1 used by the first control circuit 114 in the first mode, but different setpoints can be used in other examples. In addition, the second logic circuit 140 compares the output voltage VO with a threshold value TH as shown in FIG. 1. The setpoint values SP1 and SP2, and the threshold value TH can be predetermined values, or external circuit connection terminals can be provided on the IC 101 in order to allow external control over one or more of these values.

The second logic circuit 140 in FIG. 3 includes an output voltage (VO) regulation circuit 300 that receives the output voltage signal VO from an input 134 and provides an ENABLE POWER CYCLE Boolean output to the input of an AND gate 306. The circuit 300 enables a power cycle request based on close loop regulation of the output voltage VO, and can implement any peak or valley current control scheme, alone or in combination with a voltage regulation scheme in order to attempt to maintain the output voltage VO at the second setpoint level SP2 by selectively initiating cycle start request signals when the ENABLE POWER CYCLE is at a logic high level. In one example, the VO regulation circuit 300 includes a comparator with inputs connected to the output voltage signal VO and a reference voltage representing the setpoint SP2, and the output asserts the ENABLE POWER CYCLE signal logic high when the output voltage signal VO falls below the regulation point SP2. The output of the AND gate provides a set or "S" input to a flip-flop 308. The "Q" output of the flip-flop 308 provides an input to an OR gate 320. The output of the OR gate 320 provides an input to the driver 132 in order to operate the second switch S2. In this manner, the regulation circuit 300 provides closed loop regulation of the output voltage signal VO with respect to the second setpoint SP2 by initiating cycle start requests to cause the first control circuit 114 to initiate a new power transfer cycle.

The logic circuit 140 further includes a transmission window control circuit 302 that receives the second switch voltage signal VDS2 from the input 131, and provides a transmission window output signal TX WINDOW to a second input of the AND gate 306. The circuit 302 provides the TX WINDOW at a logic high level when the logic circuit 140 is permitted to transmit a signal to the first control circuit 114. For example, the circuit 302 holds the TX WINDOW signal logic low when the VDS2 signal indicates that the primary side switch S1 is turned on, and thereby prevents turning on both S1 and S2 at the same time. The circuit 302 can infer that the primary side switch S1 has been turned off in one example by comparing the VDS2 voltage with the output voltage VO, and when these voltages are substantially equal, the secondary current IS 2 has reached zero and the primary side switch S1 is turned off. If the VDS2 voltage signal, however, is greater than the output voltage VO, the circuit 302 holds the TX WINDOW signal low, as this condition can imply that the primary switch S1 is turned on.

A valley detect control circuit 304 also monitors the VDS2 signal and provides a synchronous rectifier drain valley output signal SRDRAIN VALLEY to a third input of the AND gate 306. The circuit 304 provides the SRDRAIN VALLEY signal at a logic high level in one example when a valley or local minima is detected in a ringing waveform of the VDS2 signal. In this example, the circuit 304 facilitates turning on the switch S2 at or near a valley in such a ringing waveform in order to mitigate switching losses.

In addition, a synchronous rectifier on-time control circuit 310 receives the second switching control signal SC2 and VDS2, and provides a Boolean on-time control signal to the input of an OR gate 314. The OR gate 314 provides a synchronous rectifier "off" signal SROFF to operate the reset "R" input of the flip-flop 308 in order to turn the switch S2 off when the SROFF signal is logic high. The on time for the switch S2 can be maintained to be short enough to mitigate losses, while long enough to ensure proper receipt of the cycle start request signal by the first control circuit 114 on the primary side. In certain examples, the on-time control circuit 310 can implement a predetermined on-time value, for example, a fraction of the period of a resonant ringing waveform the in the VDS2 signal (e.g., 40%). In other examples, the circuit 310 can receive a signal from external circuitry through a corresponding IC terminal (not shown) to set the on time for the second switch S2.

The logic circuit 140 also includes an under voltage fault logic circuit 312, which receives the output voltage signal VO from the first end 124 of the secondary winding 122 via the control circuit input 134. The fault logic circuit 312 generates a FAULT output signal as an input to the OR gate 314 when the output voltage VO is less than a threshold level TH. The threshold TH can be a predetermined value, or can be derived from an external circuit via an IC terminal (not shown). The fault circuit 312 provides a logic high FAULT output signal to the input of the OR gate 314 in order to provide a logic high reset signal to the flip-flop 308, thereby preventing switching operation of the second switch S2 until the output voltage VO is greater than or equal to the threshold TH. In one example, the fault circuit 312 includes a comparator with inputs connected to the input 134 and a reference providing a threshold voltage signal TH, with the comparator output providing the FAULT signal.

The logic circuit 140 also includes a normal synchronous rectifier control circuit 316 the receives the output voltage signal VO and the VDS2 switch voltage signal, and provides a logic high input to the OR gate 320 to cause the driver 132 to turn on the second switch S2 shortly after the primary side first switch S1 is turned off, and to turn the switch S2 off again when voltage signals VDS2 and GND2 are substantially equal indicating that the secondary current through the winding 122 has reached zero.

Figure 4:
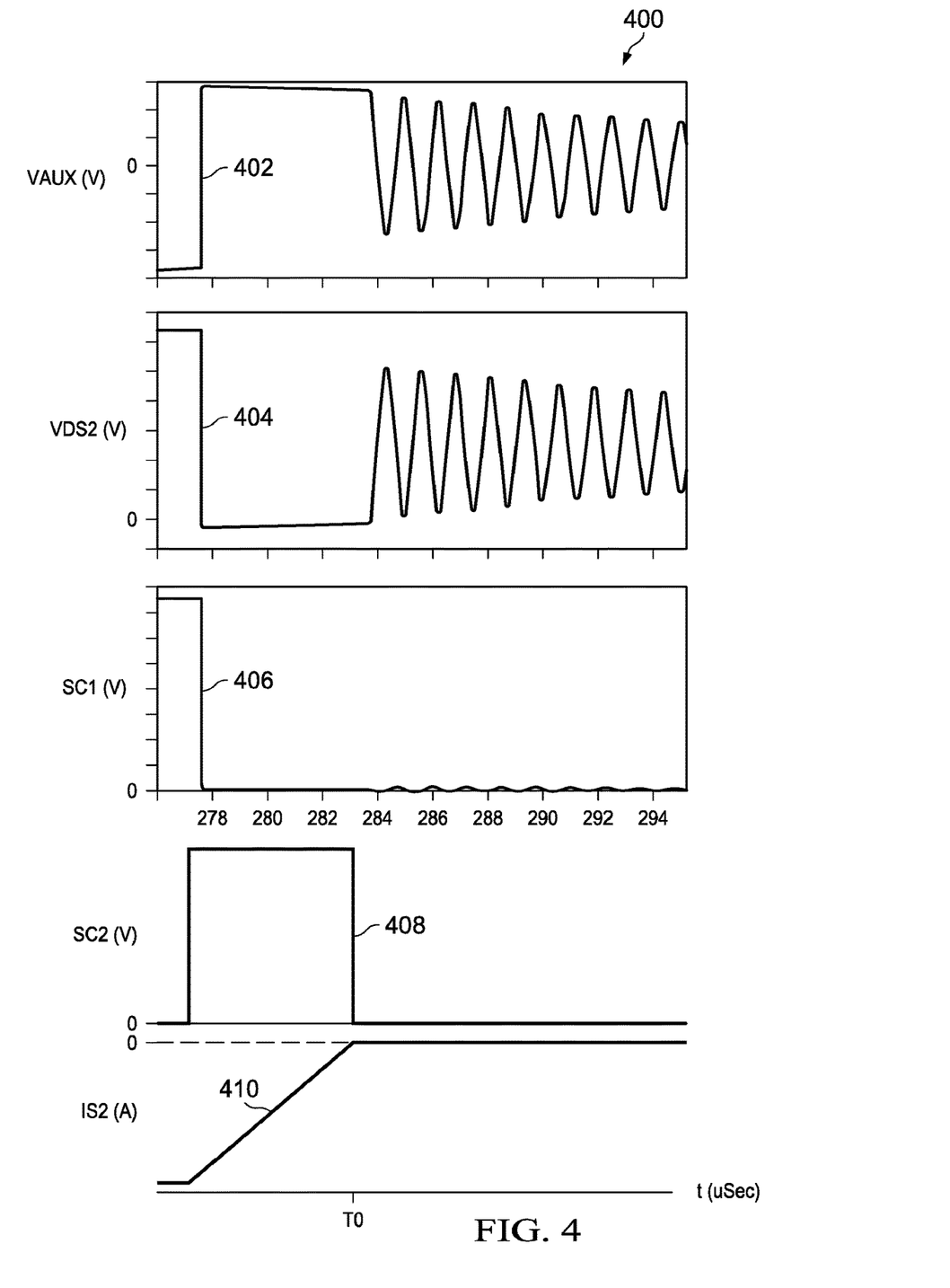
FIG. 4 is a waveform diagram of signals in the converter of FIG. 1 with the primary control circuit operating in a first mode to independently control the output voltage.
Figure 5:
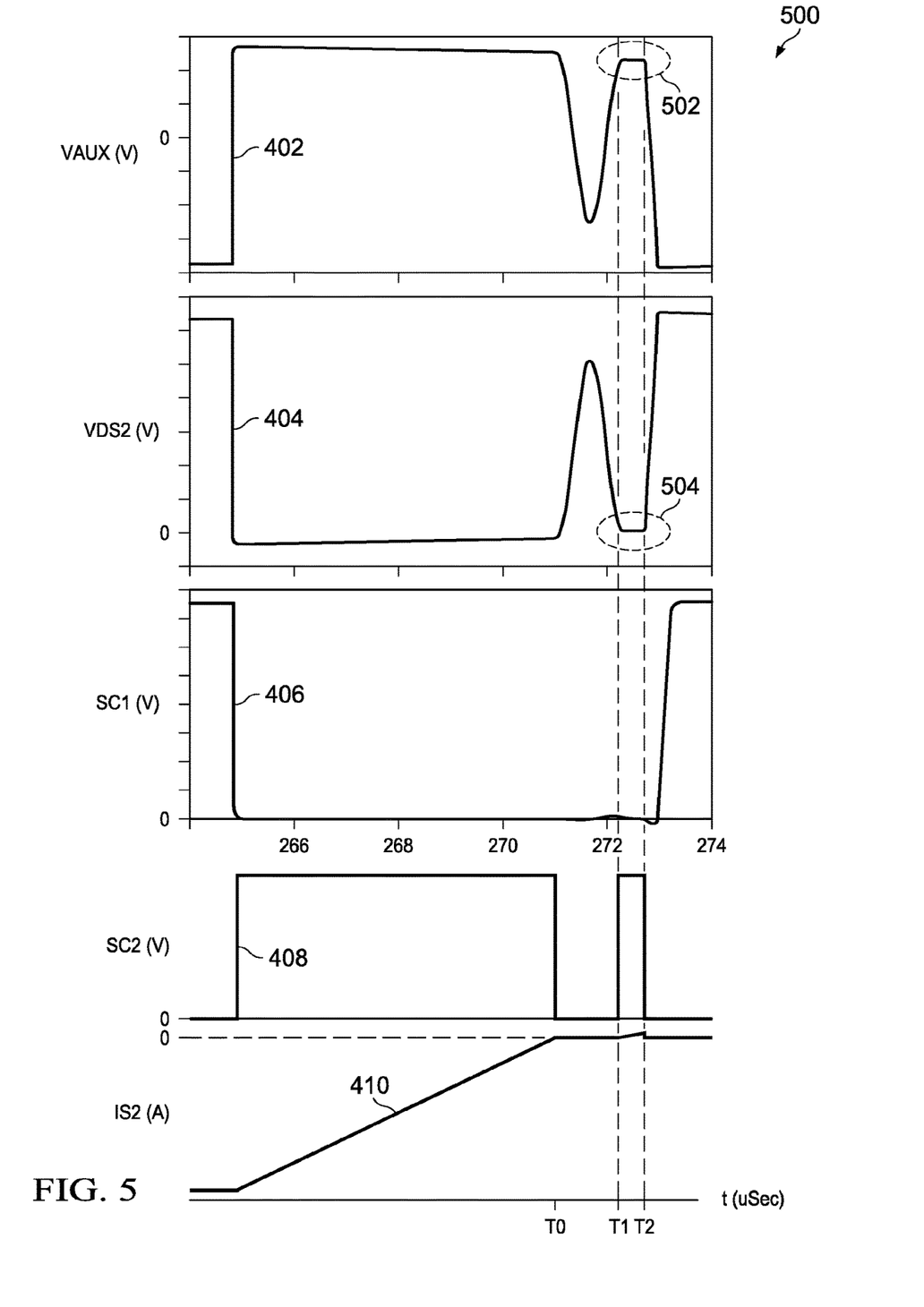
FIG. 5 is a waveform diagram of signals in the converter of FIG. 1 with the primary control circuit operating in a second mode for secondary side regulation of the output voltage, in which the secondary control circuit operates a secondary side switch to generate a predetermined cycle start request signal at or near a next valley in a ringing secondary switch voltage waveform after time at which a new power transfer cycle is desired to regulate the flyback converter output voltage.
Figure 6:
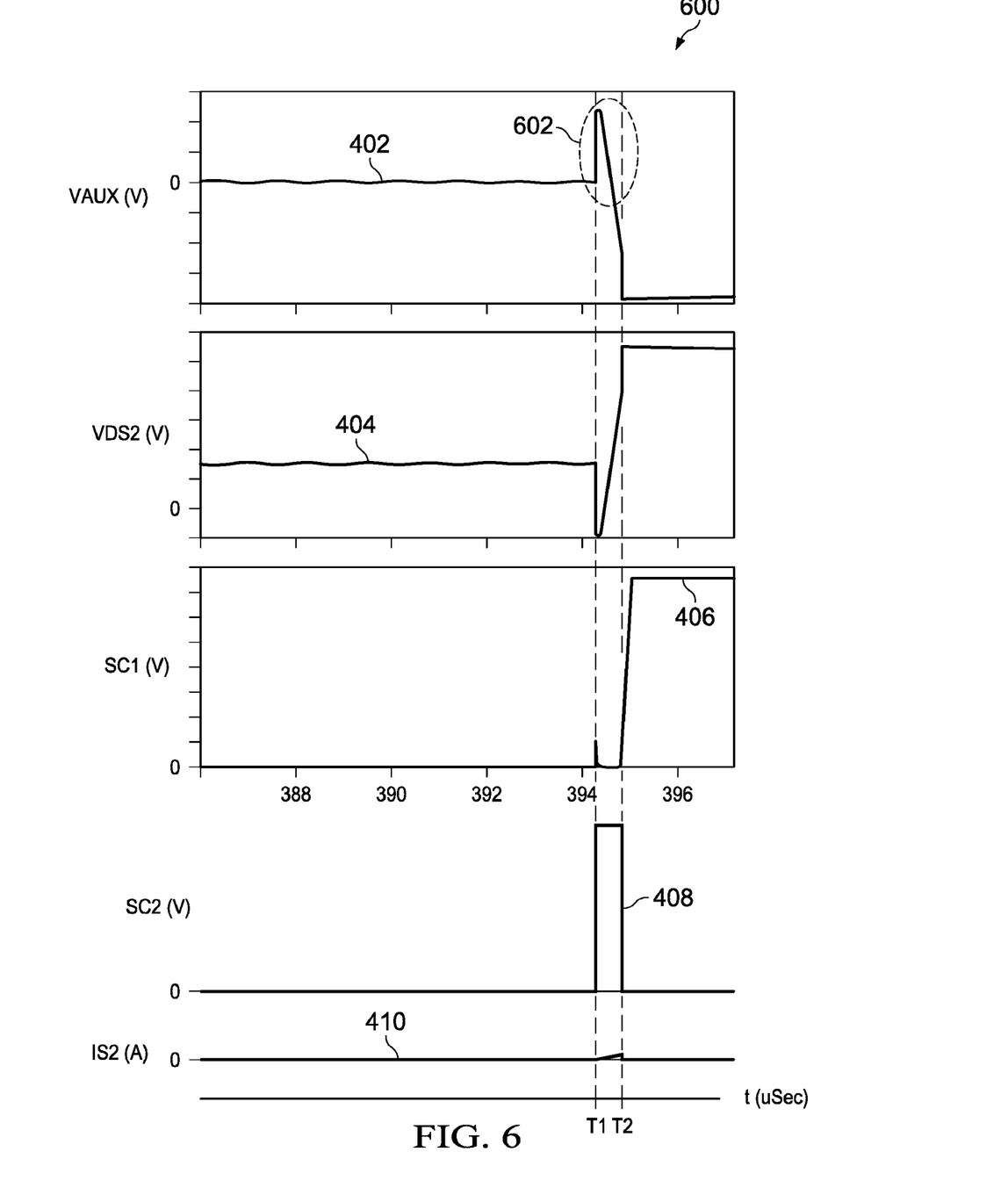
FIG. 6 is a waveform diagram of signals in the converter of FIG. 1, in which the secondary control circuit generates a cycle start request signal when a new power transfer cycle is desired to regulate the output voltage where there is substantially no ringing in the switch voltage signal waveform.

Referring also to FIGS. 4-7, waveform diagram 400, 500 and 600 in FIGS. 4-6 respectively illustrate example signal waveforms in the flyback converter 100 of FIGS. 1-3. The diagram 400 and FIG. 4 illustrates the auxiliary voltage signal VAUX 402, the switch voltage signal VDS2 404, the first and second switching control signals SC1 406 and SC2 408, as well as the secondary side current signal IS2 410 with the primary control circuit 114 operating in the first mode to independently control the output voltage or in the second mode where the next power cycle has not yet been requested. As seen in FIG. 4, SC1 goes low and SC2 goes high in a given power transfer cycle, causing the current IS 22 ramp towards zero. When the second control circuit 130 detects that IS2 has reached zero at time T0, SC2 goes low in order to turn off the switch S2. In one example, the normal SR control circuit 316 (FIG. 3) provides an output to control the on time of the switch S2 in the first portion of the power transfer cycle, and asserts its output to the OR gate 320 (e.g., at time T0 in FIG. 4) in order to implement normal synchronous rectification. After T0, a ringing or resonant waveform appears in the VAUX and VDS2 signals 402 and 404 after the IS2 current has returned to zero.

FIG. 5 shows operation in which the first control circuit 114 operates in the second mode for secondary side regulation of the output voltage VO. In this case, the secondary control circuit 130 operates the switch S2 to generate a predetermined cycle start request signal at or near a next valley in the ringing secondary switch voltage waveform VDS2 after time at which a new power transfer cycle is desired to regulate the flyback converter output voltage VO. In this example, the valley detect circuit 304 (FIG. 3) identifies the valley or local minima in the VDS2 waveform 404 at time T1. Where the output voltage regulation circuit 300 has previously asserted the ENABLE POWER CYCLE signal indicating that a new power transfer cycle is desired for output voltage regulation purposes, the valley detection signal SRDRAIN VALLEY allows the output signal from the AND gate 306 to go to a logic high state at T1 in order to turn on S1. The SR on-time control circuit 310 receives the corresponding SC2 switching control signal from the driver 132 (or from the output of the OR gate 320), and determines the time T2 at which the switch S2 will be again turned off. In this example, the time T2–T1 is a fraction of the period of the illustrated resonant waveforms of the VDS2 and VAUX signals 404 and 402. In this example, where the desired new cycle start time is determined during the oscillation of the resonant or ringing waveform of the VAUX and VDS2 signals 402 and 502, the second control logic circuit 140 operates the switch S2 in order to turn on at or near the valley of the waveform 404, thereby creating a discontinuity or interruption 504 in the signal waveform 404, as well as a discontinuity or interruption 502 in the VAUX signal waveform 402. The primary side first control circuit 114 monitors the VAUX signal waveform 402 and detects the predetermined cycle start request signal 502 as an interruption in the ringing waveform 402. In response to detection of this form of cycle start request signal 502, the circuit 114 initiates a new power transfer cycle by turning on the primary side first switch S1 slightly after T2 as illustrated in FIG. 5. The timing of turning the primary switch S1 on can be used to achieve zero voltage switching (ZVS) and valley switching on the primary side, thereby reducing switching loss. Turning on S2 builds a negative current in the secondary winding and takes a small amount of energy from the output capacitor, which will be eventually circulated back to the input as S2 turns off. By scaling the S2 on time appropriately with VIN and VO, a current can be built in the secondary winding 122 that can achieve Zero Volt Switching (ZVS) on the primary switch node 110, thus reducing the switching losses. In this process, some energy is re-circulated from the output capacitor CO back to the primary capacitance through the power transformer 104.

FIG. 6 further illustrates operation of the secondary control circuit 130 to generate a cycle start request signal received as a spike 602 in the VAUX signal waveform 402 in another situation in which the new power transfer cycle is desired after the ringing or resonant oscillation has diminished in the VAUX and VDS2 waveforms 402 and 404. In this situation, the upper voltage regulation circuit 300 (FIG. 3) asserts its output signal when the closed loop regulation of the output voltage indicates that a new power cycle is desired, and the valley detect circuit 304 has previously asserted its SRDRAIN VALLEY output signal when the oscillation has been reduced to a threshold level. In this case, once the regulator circuit 300 determines that a new power transfer cycle is desired, the second control circuit 130 turns on S2 without waiting where there is substantially no ringing in the switch voltage signal waveform VDS2. As shown in the signal waveform 404 in FIG. 6, this closure of the switch S2 at time T1 brings the VDS2 voltage to zero, causing a corresponding positive spike in the auxiliary winding voltage signal VAUX 402. The first control circuit 114 detects this spike in the VAUX signal waveform 402 and determines that a cycle start request signal 602 has been received from the secondary side control circuit 130. In response, the first control circuit 114 turns on S1 shortly after time T2 in order to initiate a new power transfer cycle in the flyback converter 100.

Figure 7:
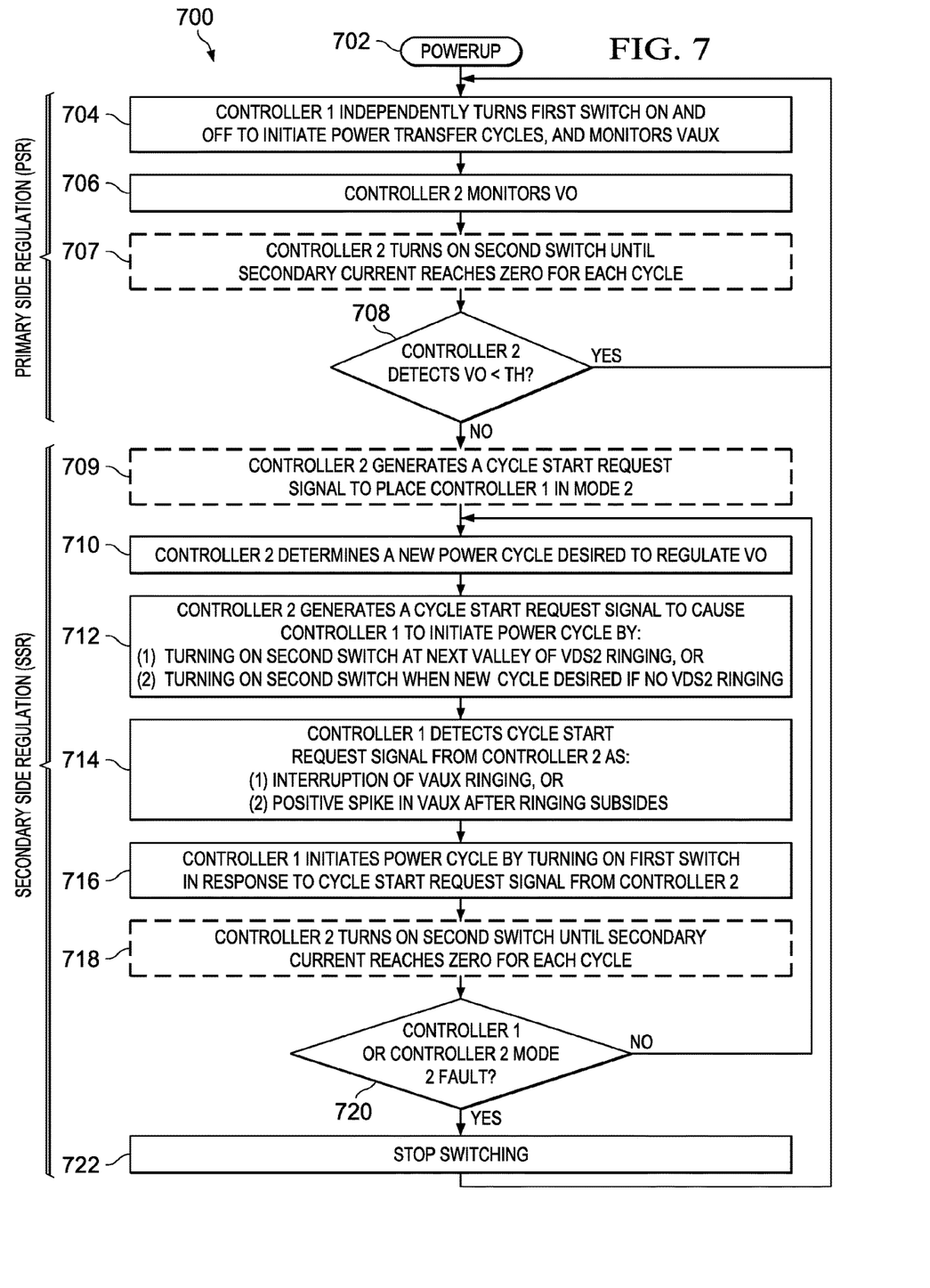
FIG. 7 is a flow diagram illustrating a method of operating a flyback converter to implement secondary side regulation.

FIG. 7 provides a flow diagram 700 showing a process or method 700 to operate a flyback converter to implement secondary side regulation. The method 700 can be implemented in one example in the above-described DCM flyback converter 100 of FIGS. 1-3, or by the dual controller example in FIG. 8, and will be described in connection therewith. However, the method 700 and other methods of the present disclosure can be implemented in other systems. At 702 in FIG. 7, the process 700 begins with power up of the flyback converter 100. Initially, the controllers 114 and 130 operate in a first mode for primary side regulation at 704-708. At 704, the first controller 114 independently turns the first switch S1 on and off to initiate power transfer cycles, and monitors the auxiliary winding voltage signal VAUX. During this operation, the second controller 130 monitors the output voltage signal VO at 706 in FIG. 7. During this first mode operation, moreover, a separate synchronous rectifier diode in the secondary circuitry (not shown) can perform synchronous rectification on the secondary side of the transformer 104, in which case the second control circuit 130 maintains the second switch S2 in the off state. In other examples, where the second switch S2 is used for active synchronous rectification, the second controller 130 optionally turns on the second switch at 707 in FIG. 7 until the secondary current IS2 reaches zero for each power transfer cycle as described above. At 708, the second controller 130 determines whether the detected output voltage VO is less than the threshold value TH. If so (YES at 708), the process 700 continues in the first operating mode at 704-78 has described above.

Once the second control circuit 130 determines that the output voltage VO has reached or exceeded the threshold TH (NO at 708), the method 700 proceeds at 709-718 for operation in a second mode for secondary side regulation in which the first controller 114 acts a receiver, waiting for a power transfer cycle request from the transmitter implemented in the controller 130. In one example, the second control circuit 130 optionally generates a cycle start request signal at 709 in order to place the first control circuit 114 in the second operating mode. In this case, the initial cycle start request signal (e.g., 502, 602 above) is used solely to indicate the operational mode change to the first control circuit 114, which does not immediately initiate a new power cycle with the first switch S1. In other examples, the first control circuit 114 merely awaits an initial cycle start request signal 502, 602 and responds by beginning a new power transfer cycle by turning on the switch S1. At 710 in FIG. 7, the second control circuit 130 determines that a new power cycle is desired in order to regulate the output voltage signal VO.

At 712, the second control circuit 130 generates a cycle start request signal to cause the first control circuit 114 to initiate the power cycle through one of two mechanisms. In the first case, where the new cycle is determined to be desired while the VDS2 signal is still ringing or oscillating, the second control circuit 130 turns on S2 at the next valley of the VDS2 ringing waveform. Otherwise, if the resonance or ringing has subsided by the time the second control circuit 130 determines that a new power transfer cycle is desired, the circuit 130 turns on S2 without waiting for any resonant valley. At 714, the first control circuit 114 detects the cycle start request signal from the second control circuit 130 as either an interruption of the ringing waveform in the VAUX signal, or as a spike in the VAUX signal after the ringing has subsided. In response to this signal detection at 714, the first control circuit 114 initiates a new power cycle at 716 by turning on the first switch S1. As illustrated at 718 in FIG. 7, where the second switch S2 is used for both new cycle request signaling to the primary side controller 114 as well as for synchronous rectification on the secondary side, the second control circuit 130 also turns on the second switch S2 until the secondary current IS2 reaches zero for each power transfer cycle. In this manner, the secondary side control circuit 130 turns on the second switch S2 twice in each power transfer cycle in the second operating mode, including an initial actuation for synchronous rectification during power transfer, as well as a subsequent actuation to provide the cycle start signal to the primary side control circuit 114. The method 700 continues at 720, and if either controller 114 or 130 have a fault condition in the second mode (YES at 720), switching operation is stopped at 722, and the process 700 returns to await another power up at 702. If there are no mode 2 faults (NO at 720), the operation continues at 710-718 as described above in the second mode for secondary side regulation.

Figure 8:
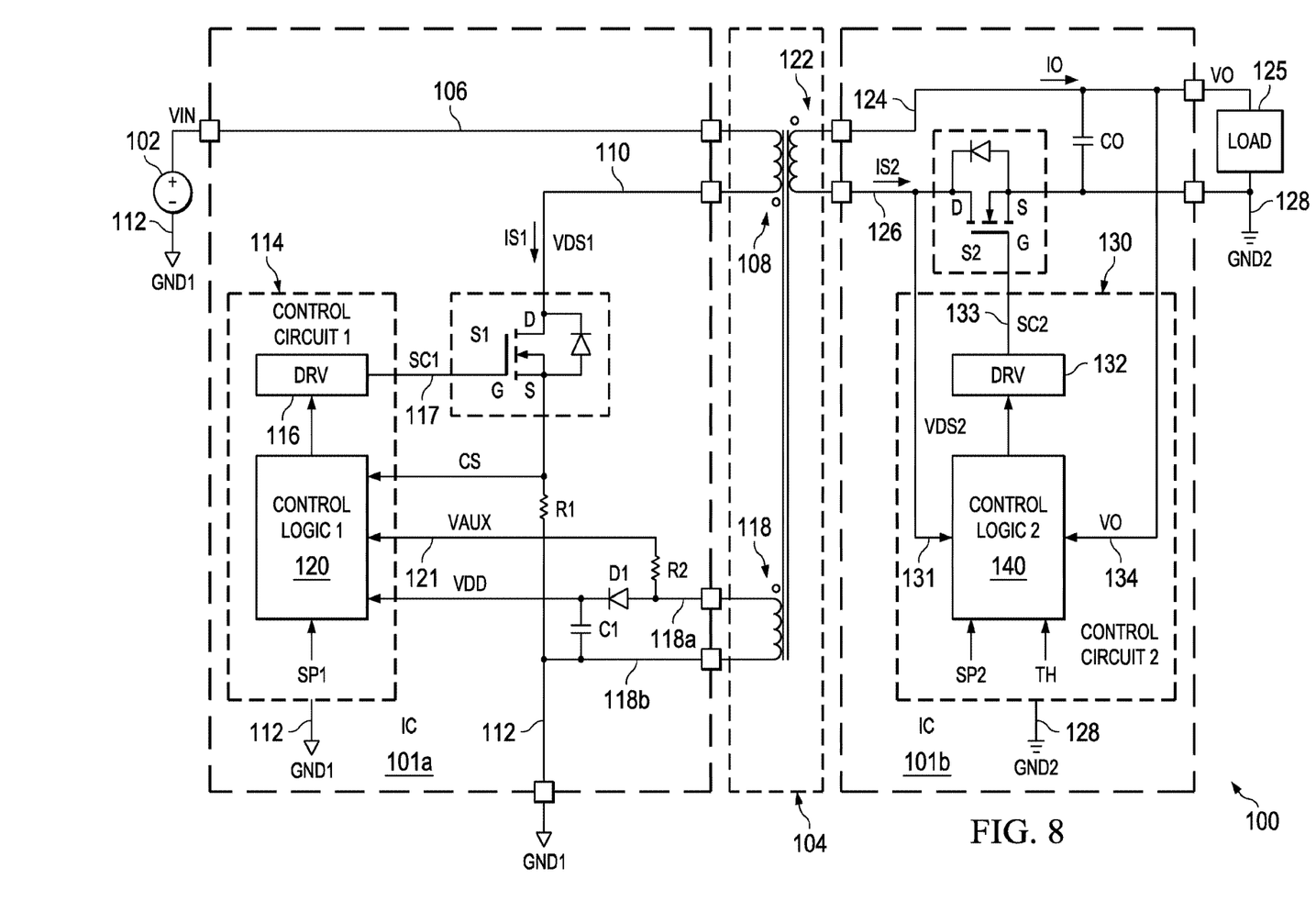
FIG. 8 is a schematic diagram of a flyback converter with separate integrated circuits for the primary and secondary side control.

FIG. 8 shows another example flyback converter 100 with separate integrated circuits 101a and 101b for the primary and secondary side control circuitry 114 and 130, respectively. The control circuits 114 and 130 to facilitate communication of power cycle start requests from the secondary side controller 130 and the second IC 101b to the primary side controller 114 in the first IC 101a using the above-described signaling techniques via the auxiliary winding 118 of the transformer 104.

The above described circuits and methods facilitate secondary side regulation of a DCM or other type of flyback converter 100 by allowing the secondary side control circuit 130 to communicate to the primary side control circuit 114 to initiate a power transfer cycle. In certain examples, the secondary side circuit 130 controls when and how often to deliver power transfer cycles in order to regulate the output voltage or current provided to the load 125. This approach advantageously achieves all the improvements associated with secondary side control compared with primary side control, without addition of extra circuit components and the corresponding additional circuit board space and cost. In particular, a secondary side regulated flyback converter can be constructed with a single controller IC 101 and a transformer 104 in a cost effective, area efficient implementation. This technique can be extended to the sensing a change in characteristics of the waveforms on the primary switch drain or gate, or the Current Sense (CS) pins of the controller 114 for example, the communication can be detected on the primary side through monitoring the SC1 and CS signals by the control circuit 114. In this regard, the transfer of magnetizing current built up in the secondary winding 122 to the primary winding 108 results in the primary switch node 110 slewing lower than a faster dv/dt. This results in a change in electrical characteristics on the gate terminal G of the switch S1 and the source terminal S providing the current sense signal CS. The voltages at the gate and source of the switch S1 can be sensed to detect a power cycle request from the secondary side controller 130 in other examples. In other examples, the primary side control circuit 114 can detect changes in the ring frequency or resonant oscillation period, such as by detecting the duration between zero crossings on the VAUX signal caused by turning on the secondary side switch S2. In other possible examples, the first control circuit 114 can discriminate or integrate, directly or indirectly, the VAUX signal or a signal on the primary switch node 110 to detect altered waveforms in order to identify requested cycle start signals from the secondary side controller 130. The above described circuitry and techniques can be employed to provide a robust and reliable solution to the challenge of enabling SSR in a DCM flyback converters and other flyback converter topologies in a low cost implementation with a low number of components and small board space, while providing high reliability and robustness without the need for any components like the Opto-couplers, magnetic or capacitive isolators for controlling the primary power switch, thus eliminating the cost of these components and the performance/reliability issues due to the use of these components.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

What is claimed is:

1. A power converter comprising:
a first switch having a first control terminal and first and second current terminals, wherein
the first switch is adapted to be coupled to a primary winding of a transformer;
a second switch having a second control terminal and third and fourth current terminals,
wherein the second switch is adapted to be coupled to a secondary winding of the transformer;
a first control circuit having a first control circuit input and a first control circuit output,
wherein the first control circuit input is adapted to be coupled to an auxiliary winding of the transformer, the first control circuit output is coupled to the first control terminal, the first control circuit is configured to:
in a first mode, provide, at the first control circuit output, a first switching control signal independent of a predetermined cycle start request signal, wherein
the first switching control signal is configurable to initiate a power transfer cycle actuated by the first switch in response to the predetermined cycle start request signal received at the first control circuit input; and
in a second mode, provide, at the first control circuit output, the first switching control signal in response to the predetermined cycle start request signal; and
a second control circuit having a second control circuit input and a second control circuit output, wherein the second control circuit output is coupled to the second control terminal, and the second control circuit is configured to provide a second switching control signal at the second control circuit output, in which the second switching control signal is configured to trigger the predetermined cycle start request signal in response to detecting a current of the secondary winding returning to zero.

2. The power converter of claim 1, wherein:
the primary winding has first and second primary terminals, in which the first primary terminal is coupled to an input voltage terminal that is configured to provide an input voltage signal, and the second primary terminal is coupled to the first current terminal;
the secondary winding has first and second secondary terminals, in which the first secondary terminal is coupled to an output voltage terminal that is configured to provide an output voltage signal, and the second primary terminal is coupled to the third current terminal; and the auxiliary winding has first and second auxiliary terminals, in which the first auxiliary terminal is coupled to the first control circuit input, and the second auxiliary terminal is coupled to a constant voltage terminal.

3. The power converter of claim 1, wherein the second control circuit is configured to trigger the predetermined cycle start request signal responsive to an output voltage being above a predetermined threshold value.

4. The power converter of claim 1, wherein the second control circuit is configured to:
turn on the second switch a first time during a previous power transfer cycle prior to the power transfer cycle, and in response to the first switch turning off,
turn off the second switch during the previous power transfer cycle in response to detecting the current of the secondary winding returning to zero; and
turn on the second switch a second time to trigger the predetermined cycle start request signal during the previous power transfer cycle.

5. The power converter of claim 4, wherein the second control circuit is configured to turn on the second switch the second time after detecting a next valley in a ringing pattern of a switch voltage signal provided by the secondary winding.

6. The power converter of claim 1, wherein the first control circuit is (Original) configured to detect the predetermined cycle start request signal as a spike signal received from the auxiliary winding.

7. The power converter of claim 1, wherein the first control circuit is configured to change from operating in the first mode to operating in the second mode in response to a first detection or a subsequent detection of the predetermined cycle start request signal at the first control circuit input.

8. The power converter of claim 1, wherein the first control circuit is configured to detect the predetermined cycle start request signal as an interruption of a ringing waveform of a voltage from the auxiliary winding.

9. The power converter of claim 1, wherein the first control circuit and the second control circuit are included in a single integrated circuit.

* * * * *